United States Patent [19]

Vandenbossche

[11] 4,353,356

[45] Oct. 12, 1982

[54] SOLAR COLLECTOR UNITS WITH MOUNTING FRAME

[75] Inventor: Benjamin E. Vandenbossche, Hillsborough, Calif.

[73] Assignee: Sealed Air Corporation, Saddle Brook, N.J.

[21] Appl. No.: 54,642

[22] Filed: Jul. 3, 1979

[51] Int. Cl.³ .................................................. F24J 3/02
[52] U.S. Cl. .................................... 126/450; 126/417; 126/445; 126/448; 126/418; 126/444
[58] Field of Search ............... 126/417, 450, 444, 445, 126/448, 418; 165/81, 82, 133, 170, 76, 78, 485

[56] References Cited

U.S. PATENT DOCUMENTS

| | | | |
|---|---|---|---|
| 3,887,967 | 6/1975 | Vandenbossche | 248/499 |
| 3,965,887 | 6/1976 | Gramer et al. | 126/450 X |
| 4,086,912 | 5/1978 | Freeman | 126/450 X |
| 4,089,324 | 5/1978 | Tjaden | 126/445 |
| 4,144,874 | 3/1979 | Zebuhr | 126/450 X |
| 4,150,661 | 4/1979 | Callegari | 126/450 X |
| 4,205,662 | 6/1980 | Rhodes et al. | 126/446 X |
| 4,212,291 | 7/1980 | Erb | 126/450 X |
| 4,244,353 | 1/1981 | Straza | 126/432 |
| 4,261,338 | 4/1981 | McAlister | 126/450 |
| 4,271,818 | 6/1981 | Hastwell | 126/450 |

Primary Examiner—Larry Jones
Attorney, Agent, or Firm—Lerner, David, Littenberg & Samuel

[57] ABSTRACT

A rigid metal framework includes parallel u-shaped guides which are spaced apart and lined with a resilient material for supporting the edges of a solar absorber or core, which guides are connected with separate transverse members at their opposite ends together with intermediate cross-supports to increase the rigidity of the framework and a clamp in one of the housings to secure a manifold of a solar absorber, thereby allowing expansion and contraction of the core to occur in the guides, thereby providing support of the core without creating stress in the absorber. The framework can be fixed to the installation site but allows the absorber to float in a controlled manner within the framework without damage, as thermal conditions change. In addition, the framework design allows glazing (transparent covers) to be placed over the absorber, enhancing the efficiency of the resulting collector unit. The framework also enables the several units to nest together without typical stresses found in multipanel installations having large absorbing surface areas.

15 Claims, 8 Drawing Figures

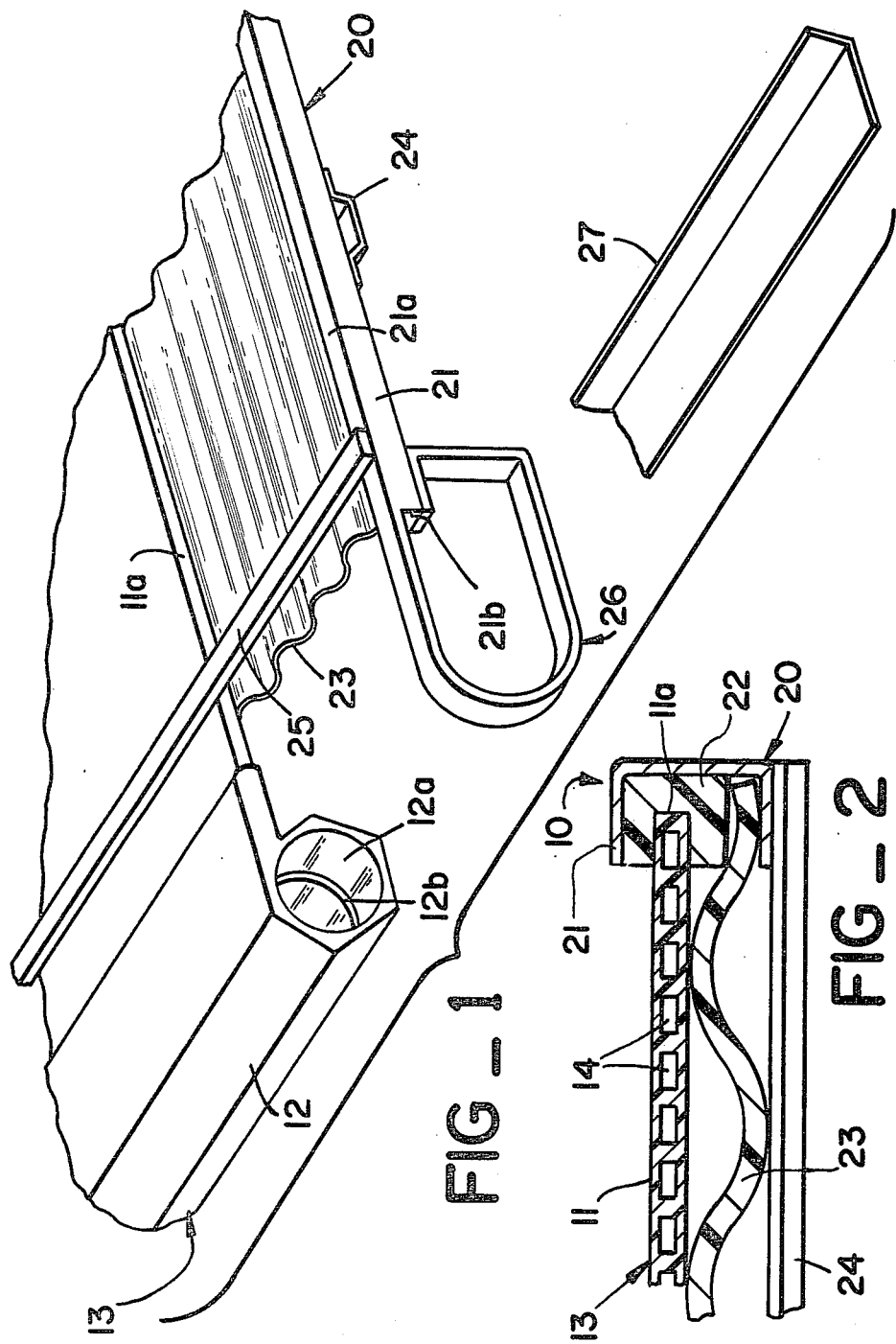

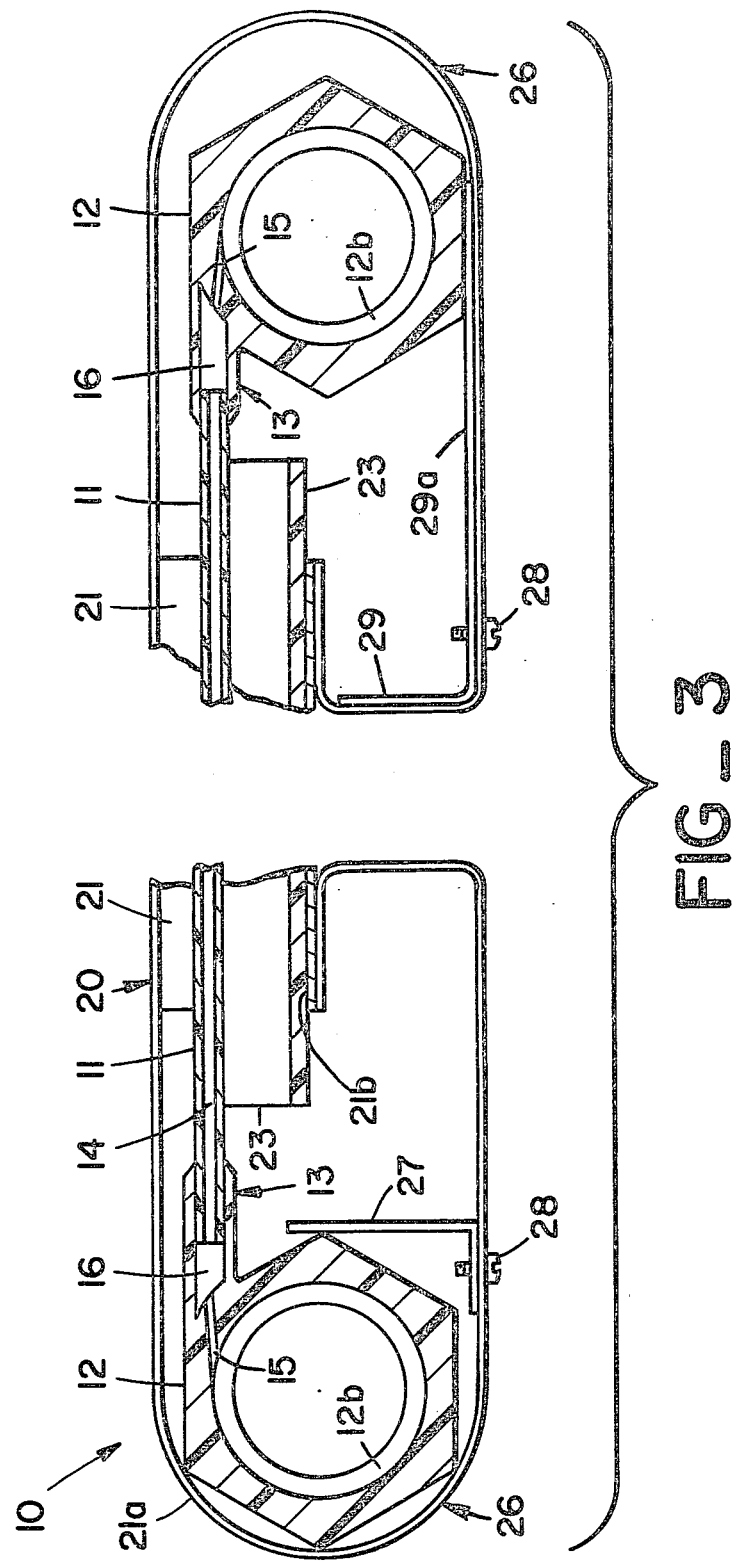

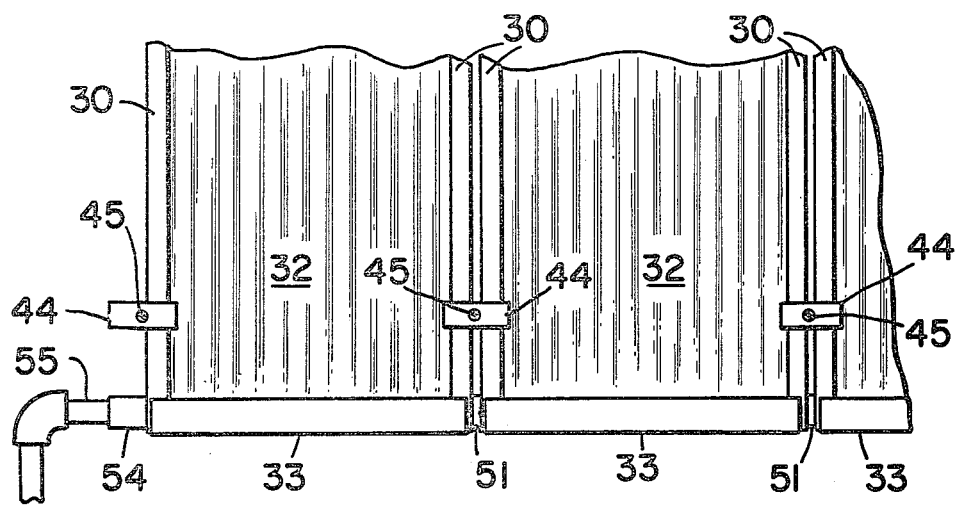
FIG_8
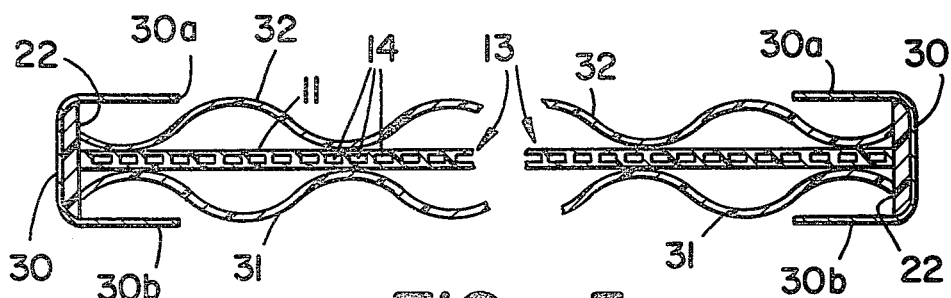
FIG_5
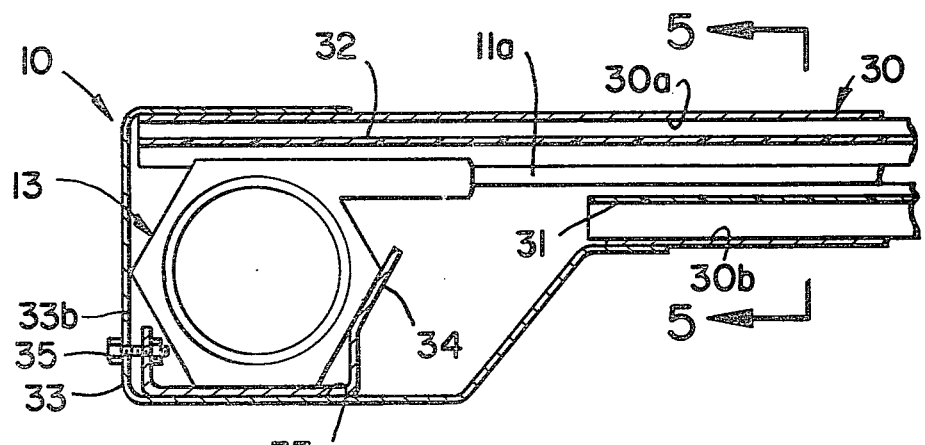
FIG_4

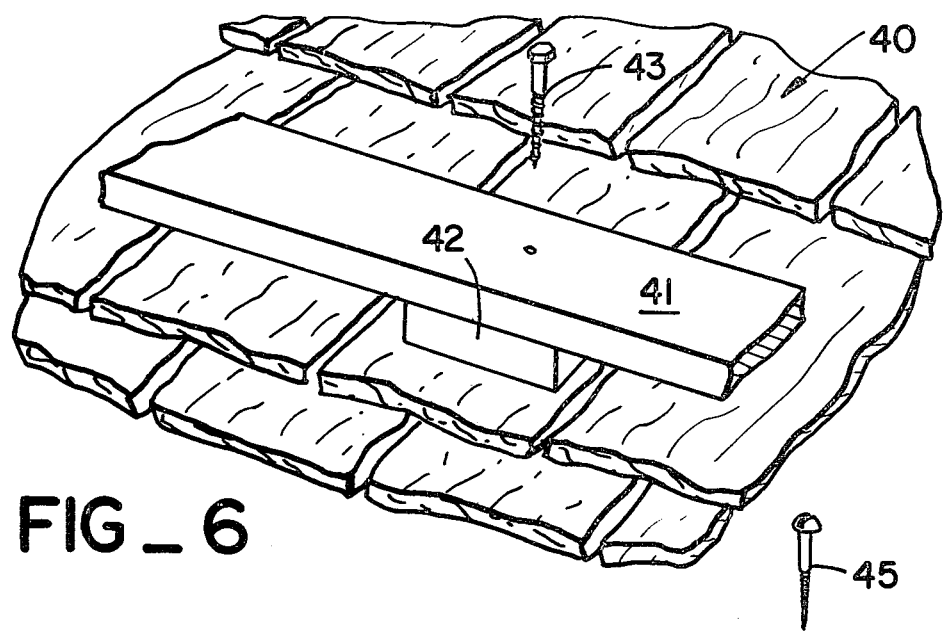
FIG_6
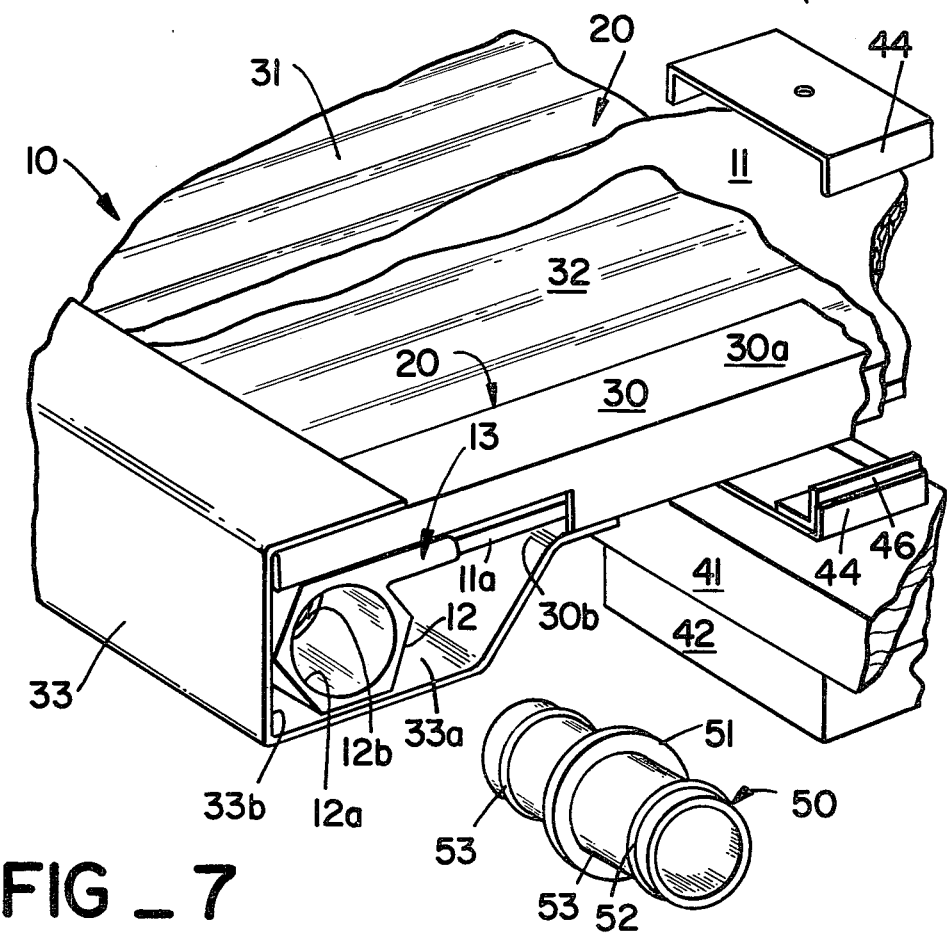
FIG_7

SOLAR COLLECTOR UNITS WITH MOUNTING FRAME

BACKGROUND OF THE INVENTION

In many areas of the United States, direct impingement solar collectors provide a convenient way to harness solar energy. Typically, such collectors employ a fluid circulating in a large flat, rectangular core of the collector, enabling solar radiation impinging on the flat surface to be transferred directly through conduction to the circulating fluid. Obviously, with the appropriate plumbing system, the heat energy absorbed in the fluid can be put to useful work, such as warming a swimming pool, heating a home or for processes requiring heat energy. The basic unit in such systems is the collector. It generally consists of an absorber, which can be fabricated of glass, metal or plastic. Generally, the absorbers are constructed to provide a larger planar absorbing surface which is panel-like and is referred to as the "core". This surface is designed to be directly exposed in the most advantageous orientation to receive solar radiation which is normal to the radiation.

Typically, in such panels or cores, a large number of passages or channels are provided, on or directly beneath the exposed absorbing surface, which of course increases in efficiency as its emissivity approaches unity. Since normally the channels underlying the absorption surface are axially aligned, a header is provided at each end of the core to act as a manifold for distributing fluids circulating in the core structure. One header acts as the input header and distributes fluid to the plurality of channels in the core. Under the influence of pressure, this fluid feed migrates through the core to the opposite header, where it is removed after having been warmed by conduction as a result of its transit through the core. Generally the combination of the headers and the intermediate core which extends therebetween is referred to as the absorber.

While the above description covers the more common type of collectors, there are other devices of a more costly and esoteric design. In reference to the units described, glass absorbers are currently prohibitively expensive. As a result, based on the current economic conditions, glass absorbers will normally result in a net loss, considering the investment costs and energy savings during their useful life. Also, they are fragile and difficult to install. Like glass absorbers, metal absorbers are quite expensive, and both glass and metal absorbers are particularly susceptible to freezing temperatures if water is employed. Also, metal absorbers tend to have corrosion problems as well as being electrolytically active in certain situations. This makes them unattractive for heating corrosive fluids. As a result, plastic absorbers, which are far less expensive, represent a large volume of such units sold today. They are particularly suitable since they are non-corrosive, resist scaling, and can stand mild freezing temperatures without damage. However, these plastic collectors, while having a number of desirable attributes, have relatively high coefficients of expansion, which must be taken into consideration in any proper installation.

Examples of plastic absorbers used as collectors are shown in U.S. Pat. No. 3,239,000 issued to Meagher. As can be seen from a perusal of these patents, the absorbers are typically a panel or core comprising a relatively thin sandwich section of plastic in a rectangular configuration, having a plurality of longitudinal, parallel channels disposed between the top and bottom surfaces. These channels at their ends are connected between two headers or manifolds which serve to distribute and control the fluid flow through the core. The fluid, heated during the transit through the core, is usually disseminated in a plumbing system where its absorbed heat energy can be utilized.

With proper construction and compounding of the plastic, the service life of plastic absorber cores or panels can be greatly enhanced. In particular, the polyolefins, such as polypropylene and polyethylenes, and/or mixtures thereof, are particularly suitable when combined with the suitable antioxidants and colorants, to protect these plastic panels from degradation due to heat and ultra-violet impingement on the surfaces. Carbon black is often added to the plastic, which provides some ultra-violet protection and also colors the core toward black, improving its emissivity factor. This tends to increase the operating temperatures and thus the efficiency of the core. As the operating temperature increases, the plastics become more pliable and flexible. Thus, an absorber constructed of plastic tends to be subjected to a great deal of stress as temperatures elevate and the core requires more support. This stress is generated, in part, by the high coefficient of expansion of the plastics and a necessity to tether the absorber unit on a surface, such as a roof or the like. Of course, the increased flexibility of the absorber when combined with environmental forces, such as the wind, can lead to a situation where the absorber panel is severely stressed or damaged. Sometimes the absorber panel can be literally torn from the roof or other supporting surface.

In many installations, multiple absorbers are employed in a nested arrangement, i.e., side-by-side mounting upon a surface such as a roof. Generally, such a group of absorbers can be referred to as "nested absorbers" and of course, provides the necessary surface area to collect the required amount of solar energy. The absorbers are generally 4 foot×8 foot panels nested together on a roof, and it can be appreciated that a number of mounting problems occur because the absorbers must be secured sufficiently to hold them on the roof. When the absorbers are secured, expansion and contraction of such nested absorbers must be taken into account, which can be as great as 6 to 8 inches in a 24-hour period. Obviously, such movement can develop serious stresses in the absorbers if they are improperly mounted on a roof or other exterior surface. Typically, in such installations, leakage develops as a result of absorber movement, and damage to the roof or other supporting surface is commonplace, due to the stress placed on the moorings securing the units.

Also, absorbers which have irregular exterior surfaces tend to collect debris which can accumulate in depressions, crevices or cups in the associated absorber. As a result, leaves and other debris may collect there and tend to accelerate the degradation of the plastics used in such absorbers. Accumulation of debris should be avoided, if possible, particularly in areas on a plastic surface which also can accumulate water, as it lowers efficiency.

Another problem with plastic collectors is abrasion of the absorber caused by the expansion and contraction which occurs daily. Further, when these collectors become heated, they tend to conform to the configuration of the underlying roof. As a result, the abrasion problem is accentuated due to a warped condition of the unit when it cools. Further, problems develop under the absorber when it rests against the surface of a roof. First, dry rot is likely to occur. Secondly, the moisture between the absorber and the roof increases thermal conductivity and results in heat loss from the absorber, reducing its efficiency.

Warpage of a plastic absorber in some cases may be extreme and may contribute to a substantial reduction of its service life due to the stresses developed in the absorber panel.

Beyond absorber service life and thermal efficiency considerations, an additional consideration is the techniques for mechanically securing the absorber to the roof. Due to its coefficient of expansion, the absorber must be allowed to move. Also, if it is supported away from the roof to avoid warpage and dry rot, wind can get under the flexible collector and distort it significantly. Under some situations, a flexible collector may be converted into an airfoil, placing significant stresses on mechanical hold-down structures.

All of the above problems can be overcome or significantly reduced by placing a plastic absorber in a metal frame system forming a new combination structure according to this invention, which, in addition to solving the mentioned problems, may increase the efficiency of the collector by 20% to 50% when glazing is added. The increased efficiency is due to the hothouse effect which raises the temperature of the air in immediate contact with the absorber. Normally, this temperature increase would be undesirable because of the above-described problems, however, due to the unique support system provided according to this invention, no difficulties are experienced at such elevated temperature operation.

SUMMARY OF THE INVENTION

The advantages of the invention can be achieved by a collector unit having a collector frame and a rectangular solar absorber wherein the frame includes two spaced-apart u-shaped guide means connected in a rigid parallel relationship, resilient linings within the guides against which the edges of the absorber are received in the guides, a support panel extending between said guides on which the central portion of the absorber is slidably supported and a clamping means connected to said guides for securing one end of the absorber whereby expansion and contraction of the absorber will be accommodated by the deformation of the resilient linings without causing stress in the absorber when the frame is fixedly secured to a roof or like structure. Other adjunct structures include support arrangements for the headers of the absorber and a floating o-ring nipple for connecting adjacent absorbers. In addition, the frame can provide structure through the guide means to support a glazing over the absorber.

BRIEF DESCRIPTION OF THE DRAWINGS

The invention will be better understood by reference to the attached drawings in conjunction with this specification wherein:

FIG. 1 is a broken-away perspective of the new collector unit with parts arranged in an exploded orientation to show construction details;

FIG. 2 is a cross-section through the mid-section of an assembled collector unit shown in FIG. 1;

FIG. 3 is a longitudinal section through an assembled unit shown in FIG. 1;

FIG. 4 is a longitudinal section similar to that shown in FIG. 3 for an alternate embodiment of the invention having exterior glazing over the panel or core surface;

FIG. 5 is a cross-section of a central portion of the alternate embodiment of the invention;

FIG. 6 shows in perspective a conventional shingled roof structure with mounting supports for the novel collector unit of this invention;

FIG. 7 is a perspective of the alternate collector unit with parts broken away and exploded from the mounting supports along with a floating nipple exploded from the open end of its manifold; and FIG. 8 is a plan of several collectors arranged as they would be nested together on a roof or similar structure.

DESCRIPTION OF THE PREFERRED EMBODIMENTS

The simplest of the several embodiments of the collector unit 10 is shown in FIGS. 1 through 3. As can be seen, the panel or core 11 (which has parts broken away) includes a manifold or header 12 at each end. Fluids to be heated can pass into one of the headers through the core and out of the other header. While there are other plastic absorbers 13 (i.e. core plus two headers) the type illustrated is typical.

As shown in FIG. 2, the core 11 has a plurality of side-by-side channels 14 that run parallel to one another and intersect the respective headers 12 at their opposite ends normal to the flow axis of these headers. In FIG. 3, one of the small distribution ports 15 is shown which connect the header with a distribution chamber 16 that feeds the side-by-side channels.

In such a plastic absorber, the channels 14 in the core 11 will be 8 to 10 feet long. As a result, the core may expand and contract several inches along the axes of these channels as temperature changes occur. Of course, as the distance between the headers 12 changes, the width of the core and headers also simultaneously expands and contracts due to thermal changes.

According to this invention, such a plastic absorber 13 is placed in a supporting collector frame 20 to form a finished unit 10 in which the absorber can expand and contract without damage or stress. From FIGS. 1 through 3 it can be seen that the outer edges 11a of the core 11 intermediate of the headers 12 are received in a u-shaped guide 21 constructed of metal. Disposed in the groove of this guide is a rubber or elastomer pad 22. The thickness of the pad is chosen to be sufficient to accommodate the lateral expansion and contraction of the core without allowing its edges 11a to disengage from the guides. Under the core is a corrugated fiberglass support panel 23 which extends between the several u-shaped guides that are locked in a rigid parallel relationship by cross-straps 24 and 25.

As a result of the above construction, the rectangular frame 20 will allow core 11 and the absorber 13 to float within the spaced-apart guides as it expands and contracts. The corrugated fiberglass panel 23 forms a table or planer support for the underside of the core, but has minimum contact with the supported surface as a result of its convulsions. This arrangement limits thermal losses due to conduction of heat away from the core.

In order to control the direction of expansion and contraction of the absorber 13, one of the manifolds or headers 12 of the absorber is secured to and at one end of the spaced-apart guides 21 through a clamping arrangement while the opposite header is allowed to float. The clamping structure shown in FIGS. 1 and 3 is formed by a continuation of a portion of the ends of the guides that is bent into an oval support 26 so it encircles the header. This is best shown in FIG. 3. As can be seen, one leg 21a of the u-shaped guide is extended and this strap-like structure is formed in an oval so it can be attached to the opposite leg 21b of the guide. A cross-plate 27 slides into these resulting oval loops and supports the underside of the header or manifold 12 of the absorber. As can be seen in FIG. 3, the cross-plate is secured to the loop with screws 28 and is positioned to lock or clamp the header in this structure. At the opposite end, a similar support plate 29 has a substantially larger base 29a and forms a platform on which the opposite header of the absorber can slide as expansion and contraction occurs. Because of this arrangement, the longitudinal movement will always be at one end of the collector unit 10.

More particularly, to accommodate the movement of header 12 at the opposite end of the frame, the cross-plate 29 has a greater width and is received under the header and within the several loops 26 formed by the continuation of the guides 21 where it is secured by screws 28 (see FIG. 3). This forms a smooth platform for the header to slide on when expansion and contraction occur.

The construction of the alternate embodiment of the invention is best shown in FIGS. 4, 5, 7, and 8. As can been seen, it is very similar but has glazing over the top of the absorber 13. In both embodiments, the absorber is identical and will not be further described in reference to the alternate embodiment.

As is best shown in FIGS. 4 and 5, the absorber 13 is mounted in an alternate frame arrangement. Its core 11 is mounted between two spaced-apart u-shaped guides 30 which have a wider opening between their legs 30a and 30b than guides 21. A similar elastomer pad 22 is used as a lining in the guides and accommodates both lateral and longitudinal expansion of the core as the edges 11a of the core move due to expansion and contraction. The central section of the core is similarly supported by a corrugated fiberglass support panel 31 having its edges received in the groove of the spaced-apart guides 30. Cross-bracing straps (not shown) identical to strap 24 extend under the fiberglass panel between the several guides and are fixed to the guides to secure them in a rigid, spaced-apart parallel relationship.

Over the top of the absorber, a clear corrugated fiberglass panel 32 is placed so it will have its edges received in the guides 30. It covers the entire surface of the absorber and traps hot air directly above the surface of the absorber. In some cases, this can give a temperature increase on the surface of the absorber of greater than 50% over the temperature achieved without the clear glazing panel 32. This corrugated glazing panel touches the absorber's core 11 only at spaced intervals and therefore does not conduct away much heat. If desired, flat clear sheets can be employed and spaced above the energy collecting surface of the absorber for greater efficiency by reducing the thermal losses due to conduction.

Because the absorber 13 is fully supported in the frame 20, the higher temperatures are not of consequence. The bottom panel 31 will provide the necessary support for the core 11 along its entire length. Thus, no distortion will occur as it becomes more flexible.

In the alternate embodiment, end caps 33 are employed at each end of the absorber 13. Guides 30 have their ends notched (best shown in FIG. 7) to eliminate interference with the headers 12 and a c-shaped end cap is assembled by attaching it to the leg 30a and leg 30b of each guide where the cap overlaps these legs. Rivets, screws or welding can be employed for attachment of the cap. The end cap, being box-shaped, provides a support surface 33a for the underside of the header 12 when assembled on the ends of the spaced-apart guides. In this frame assembly, the absorber is adjusted so one of the headers abuts on the upstanding wall 33b of one end cap. It is then retained in this position by a channel bracket 34 with bolt 35 at one end of this header. Alternatively this bracket can be centrally located and bolt 34 tightened to secure this header. This leaves the other header free to slide in the other end cap to accommodate expansion and contraction.

In FIG. 6 a portion of a standard shingled roof 40 is illustrated in perspective. A wooden mounting stringer 41 is shown oriented horizontally and spaced from the shingles with blocks 42. Lag bolts 43 are used to secure the stringer directly to the roof as shown. These bolts should be coated with a sealant when installed to prevent leaks. Usually three spaced horizontal stringers are used to mount the collector units 10 (composite of frame 20 and absorber 13) and are arranged so that the guides 30 rest on the top of the stringers. (See FIG. 7). Opposed c-brackets 44 are used to attach the collector units to the stringers. The width of the c-brackets is such that it will span the guides 30 of two adjacent collector units with room for a screw 45 to pass therebetween. When the screw 45 is inserted into the stringer, the adjacent collector units are properly secured in a manner by which they are suspended above the roof. This avoids the heat loss from conduction to the roof that occurs where the absorber lies directly on the shingles. If there is no adjacent collector unit, an L-shaped bracket 46 provides a spacer for the c-brackets as shown in FIG. 7.

FIG. 8 shows how the collector units 10 can be nested together on the mounting stringers 41. However, before the adjacent units are secured to the stringers, a floating nipple 50 is inserted into the open ends 12a of the manifolds or headers 12. The nipple has a rubber cuff 51 centrally received on its hollow cylindrical core 52. Proximate to each end of the core a groove is formed and an o-ring 53 is inserted. This nipple is limited in its axial movement in the open end 12a of each header by an interior step 12b, causing it to float between the two ends of the manifolds or headers it connects.

With the collector units mounted on the stringers as shown in FIG. 8, the o-rings will always be retained within the ends of the headers due to the interior steps. It can be appreciated that as a header expands or contracts axially, the floating nipple will accommodate this movement without placing any strain on either of the plastic absorbers it connects. With all of the headers which are clamped to the frame 20 located at the bottom end of the collector units 10, the floating headers at their opposite ends will move in unison both longitudinally and laterally without placing any strain on the absorber or its connection to adjacent absorbers.

An inlet plumbing connection 54 is shown in FIG. 8 and the outlet connection (not shown) is the same but located at the top of the collector units 10. The opposite ends of the aligned headers 12 are merely closed off with a plug. Thus, fluids pass into the aligned bottom headers, through the cores of the several absorbers and return to the plumbing system via the aligned top headers. The connection 54 can be a rubber hose with hose clamps securing it on the pipe 55 and a nipple extending from the header (not shown). This provides isolation from the plumbing system.

Because of the rigidity of the guides and the mounting of the absorber therein, the latter cannot distort or sag. Further, the absorbers are not affected by wind and the glazing improves efficiency in windy areas which otherwise would reduce the temperature at the surface of the absorber due to the increased convection air currents.

The structure can obviously be modified to accommodate other absorbers by slight modification of the end caps. Also, other material could be used for various parts of the frame than those specified.

Having described the invention, I claim:

1. In combination, a solar collector, which includes a pair of lateral edges and a pair of longitudinal edges, and a mounting frame for said solar collector, said mounting frame including receiving means for resiliently receiving said longitudinal edges of said collector such that said collector is free to expand and contract laterally and longitudinally, supporting means underlying said collector for slideably supporting said collector intermediate said lateral edges and said longitudinal edges thereof, clamping means formed integrally with said receiving means for clamping one of said lateral edges of said collector such that said one lateral edge is fixed relative to said mounting frame while the other lateral edge is movable relative to said mounting frame, whereby any movement of said collector as a result of the longitudinal expansion or contraction thereof will occur at said other lateral edge.

2. A mounting frame according to claim 1, wherein said receiving means includes a pair of generally U-shaped channels, each channel receiving a corresponding longitudinal edge of said collector and including a resilient lining which engages said corresponding longitudinal edge and has a thickness selected to accommodate lateral expansion and contraction of said collector without allowing said corresponding longitudinal edge to be disengaged therefrom.

3. A mounting frame according to claim 2, wherein said supporting means extends between said U-shaped channels.

4. A mounting frame according to claim 2, further comprising connecting means for rigidly connecting said channels to each other, whereby said mounting frame is a generally rigid structure.

5. A mounting frame according to claim 2, wherein said one lateral edge of said collector is delimited by a first header and said other lateral edge of said collector is delimited by a second header.

6. A mounting frame according to claim 5, wherein said clamping means includes a first pair of loops, each loop of said first pair of loops being attached to a corresponding one of said channels and encircling said first header, and a second pair of loops, each loop of said second pair of loops being attached to a corresponding one of said channels and encircling said second header.

7. A mounting frame according to claim 6, further comprising fixing means for fixing the position of said first header in each loop of said first pair of loops.

8. A mounting frame according to claim 6, wherein each loop of said second pair of loops is sized so as to slideably support said second header.

9. A mounting frame according to claim 2, further comprising trapping means for trapping hot air directly above said collector, whereby the temperature of said collector may be increased, said trapping means including a transparent sheet covering said collector and extending between said channels.

10. A mounting frame according to claim 9, wherein said transparent sheet is corrugated.

11. A mounting frame according to claim 1 or 3, wherein said supporting means is a corrugated panel.

12. A mounting frame according to claim 1, further comprising trapping means for trapping hot air directly above said collector, whereby the temperature of said collector may be increased.

13. A mounting frame according to claim 12, wherein said supporting means cooperates with said trapping means to sandwich said collector therebetween.

14. A solar collector system, comprising a plurality of adjacent collector units, each collector unit including a collector, said collector having a pair of lateral edges and a pair of longitudinal edges, each of said lateral edges being delimited by a corresponding header, and mounting means for mounting said collector, said mounting means including receiving means for resiliently receiving said longitudinal edges of said collector such that said collector is free to expand and contract laterally and longitudinally, supporting means underlying said collector for slideably supporting said collector intermediate said lateral edges and said longitudinal edges thereof, clamping means formed integrally with said receiving means for clamping one of said lateral edges of said collector such that said one lateral edge is fixed relative to said mounting means while the other lateral edge is movable relative to said mounting means, whereby any movement of said collector as a result of the longitudinal expansion or contraction thereof will occur at said other lateral edge; and permitting means for permitting fluid communication between said headers of adjacent collector units without inhibiting relative movement between said collector units.

15. A solar collector system according to claim 14, wherein said permitting means includes a plurality of internal couplings, each of said headers slideably receiving at least one of said couplings.

* * * * *